US005937498A

United States Patent [19]

Ploeger et al.

[11] Patent Number: 5,937,498

[45] **Date of Patent: *Aug. 17, 1999**

[54] METHOD FOR REMOVAL OF CONNECTION FOR PARKING BRAKE CABLES

[75] Inventors: Randall J. Ploeger, Clarinda, Iowa; Charles Henry Smith, Dinwiddie, Va.; Ronald Marsh, Loveland, Ohio

[73] Assignee: Lisle Corporation, Clarinda, Iowa

[ * ] Notice: This patent issued on a continued prosecution application filed under 37 CFR 1.53(d), and is subject to the twenty year patent term provisions of 35 U.S.C. 154(a)(2).

[21] Appl. No.: 08/747,623

[22] Filed: Nov. 13, 1996

[51] Int. Cl.[6] ...... B23P 19/00

[52] U.S. Cl. ...... 29/426.6; 29/278; 29/280

[58] Field of Search ...... 81/125.1, 121.1, 81/124.1, DIG. 7; 29/270, 278, 280, 237, 282, 272, 426.6, 426.5, 450, 451, 453, 512, 513, 422.1

[56] References Cited

U.S. PATENT DOCUMENTS

| | | | |
|---|---|---|---|
| 611,569 | 9/1898 | Crump | 81/DIG. 7 |
| 1,618,046 | 2/1927 | Barb | 81/125.1 |
| 2,015,613 | 9/1935 | Baumgarten | 81/125.1 |
| 3,504,414 | 4/1970 | Breen | 29/278 |
| 4,939,960 | 7/1990 | Kinzli | 81/125.1 |
| 5,084,954 | 2/1992 | Klingen | 29/237 |
| 5,473,804 | 12/1995 | Rush . | |

OTHER PUBLICATIONS

Disclosure from Larry to Lisle Corp. dated Jun. 10, 1994 relating to emergency brake cable release tool.

Disclosure from Jon to Lisle Corp. dated Feb. 10, 1995 relating to removal of emergency brake cable from the backing plate.

Disclosure from Ronald to Lisle Corp. dated Dec. 7, 1987 relating to rear parking brake cable assembly to remove from the backing plate assembly.

Disclosure from Gardner to Lisle Corp. dated Jul. 10, 1988 relating to brake cable release tool.

Disclosure from W. to Lisle Corp. dated Jan. 15, 1993 relating to removal of park brake cables from backing plates.

Disclosure from Charles to Lisle Corp. dated Jul. 4, 1993 relating to brake cable star latch remover.

Disclosure from Leroy to Lisle Corp. dated Nov. 3, 1993 relating to parking brake cable unlocking tool.

Disclosure from Jerry to Lisle Corp. dated Mar. 24, 1994 relating to emergency brake cable removal.

*Primary Examiner*—Robert C. Watson

*Attorney, Agent, or Firm*—Banner & Witcoff, Ltd.

[57] ABSTRACT

A tool for removal of emergency brake cables from engagement with the vehicle includes a handle, coaxial shafts extending in opposite directions from the cylindrical handle with angled extensions connected to the shafts and tubular members attached to the extreme ends of each of the shafts aligned coaxially and sized so as to permit engagement with and compression of locking fingers associated with snap fasteners.

1 Claim, 2 Drawing Sheets

METHOD FOR REMOVAL OF CONNECTION FOR PARKING BRAKE CABLES

BACKGROUND OF THE INVENTION

In a principal aspect the present invention relates to a mechanic's tool which is useful for removal of the parking brake cable from a vehicle for repair or replacement.

Mechanical brakes such as parking brakes operate by means of a mechanical cable which feeds from the passenger or driver compartment of a vehicle through the wall of the passenger compartment to an intermediate housing located under the vehicle. At this location, the single cable connects through mechanical means into two separate cables which feed to each rear brake through the appropriate brake-backing plate. In certain circumstances, it becomes appropriate or necessary to repair or replace one or more of these cables, or to otherwise adjust the components which are connected to these cables. In such circumstances, removal of the cables from their connection with the brake-backing plate or any of the other housings may become necessary. Detaching the cables from the brake-backing plate or any of the other housings can be very difficult in many circumstances. This results in part because the attachment to the brake-backing plate or other housings is usually in a position which is not highly accessible. Further, the attachments are typically affected by means of flexible spring arms which are locked into place or designed to engage against the various housing walls to preclude easy removal. Thus, there is developed a need for a tool which would facilitate the removal of such fastening mechanisms so as to permit easy removal of any of the parking brake cables.

SUMMARY OF THE INVENTION

Briefly, the present invention comprises a manual tool which includes a central cylindrical body with a center line axis and a steel shaft projecting from each end along the center line axis. Each steel shaft includes a first extension which lies on the center line axis of the cylindrical handle and an outer end extension which is formed at an angle with the first extension. Tubular members welded to the outside end of the second or end extensions are adapted to fit easily over the flexible fingers of a fastener which retains or connects the parking brake cable to a wall of the vehicle.

Thus, it is an object of the invention to provide an improved tool which permits and facilitates removal of a parking brake cable.

The further object of the invention is to provide a tool for disconnecting the parking brake cable connection which is rugged, economical, and which is designed to fit into cramped or crowded or restricted areas.

Yet another object of the invention is to provide a tool for removal of parking brake cable connections which is adapted for utilization with connections of various size and construction.

These and other objects, advantages and features of the invention will be set forth in the detailed description which follows.

BRIEF DESCRIPTION OF THE DRAWINGS

In the detailed description which follows, reference will be made to the drawing comprised of the following figures.

DESCRIPTION OF THE PREFERRED EMBODIMENT

Figure 1:
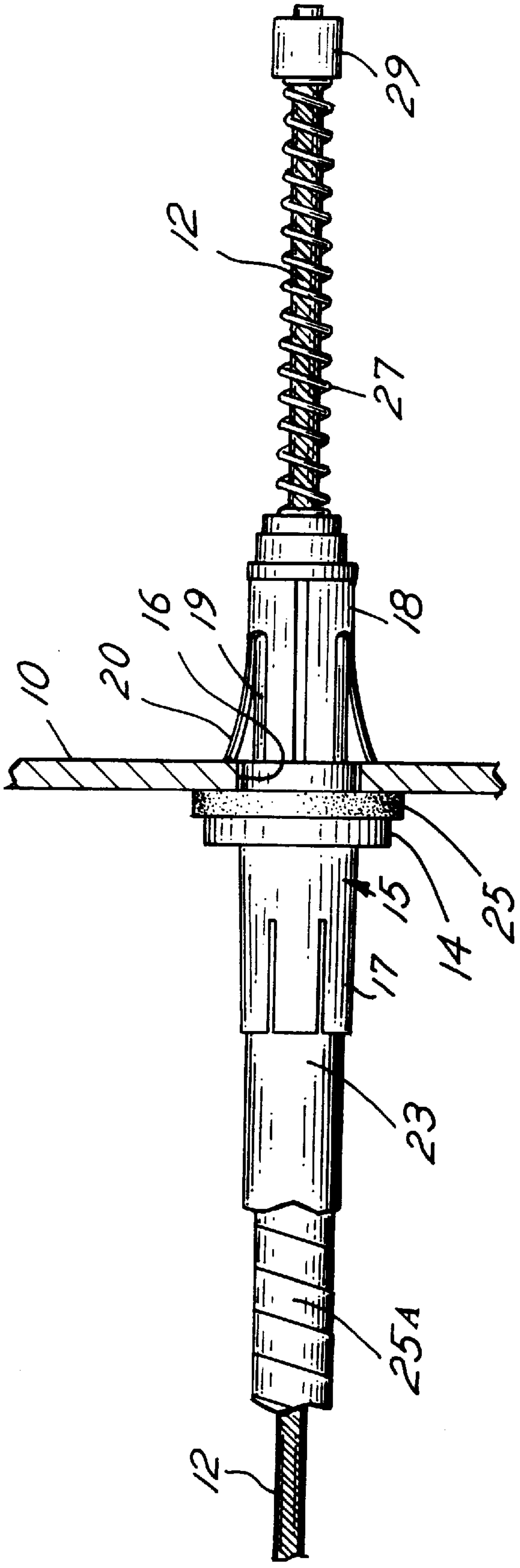
FIG. 1 is a sectional view of a typical parking brake cable assembly.

FIG. 1 depicts a typical parking brake cable assembly which retains a cable 12 in a wall or plate 10 of a vehicle body or chassis. The cable 12 is guided or fitted through a tubular fitting 15 having oppositely extending tubular sections 17, 19 separated by a collar or flange 21. Section 17 is crimped over a vinyl jacket 23 and steel housing 25 which guides the cable 12. Section 19 projects in the opposite direction from section 17 through opening 16 and includes an annular spring 18 having projecting spring fingers 20. A rubber washer 25 fits against wall 10 to insure tight retention of the fitting 15 by fingers 20 and thus maintenance of cable 12 in wall 10. A spiral compression spring 27 fits over cable 12 between section 19 and collar 29 at the end of cable 12. Removal of the cable 12 and fitting 15 from engagement with the wall 10 and, more particularly, compression of the fingers 20 to permit removal of fitting 15 is effected by the tool of the invention.

Specifically, tool 30 includes a generally cylindrical handle 32 which has a center line axis 34. A first steel shaft 36 projects axially along the center line axis 34 from the handle 32 and comprises a first extension 38 and an integral, connected, second extension 40. The second or end extension 40 is about one fourth of the length of the first or inner extension 38. The first extension 38 is about one half (½) the length of the handle 32. The extensions 38 and 40 form an included obtuse angle in the range of about 120 to 170° with each other. In a preferred embodiment, the angle between axis 34 and extension 40 is about 120°±10°.

Figure 2:
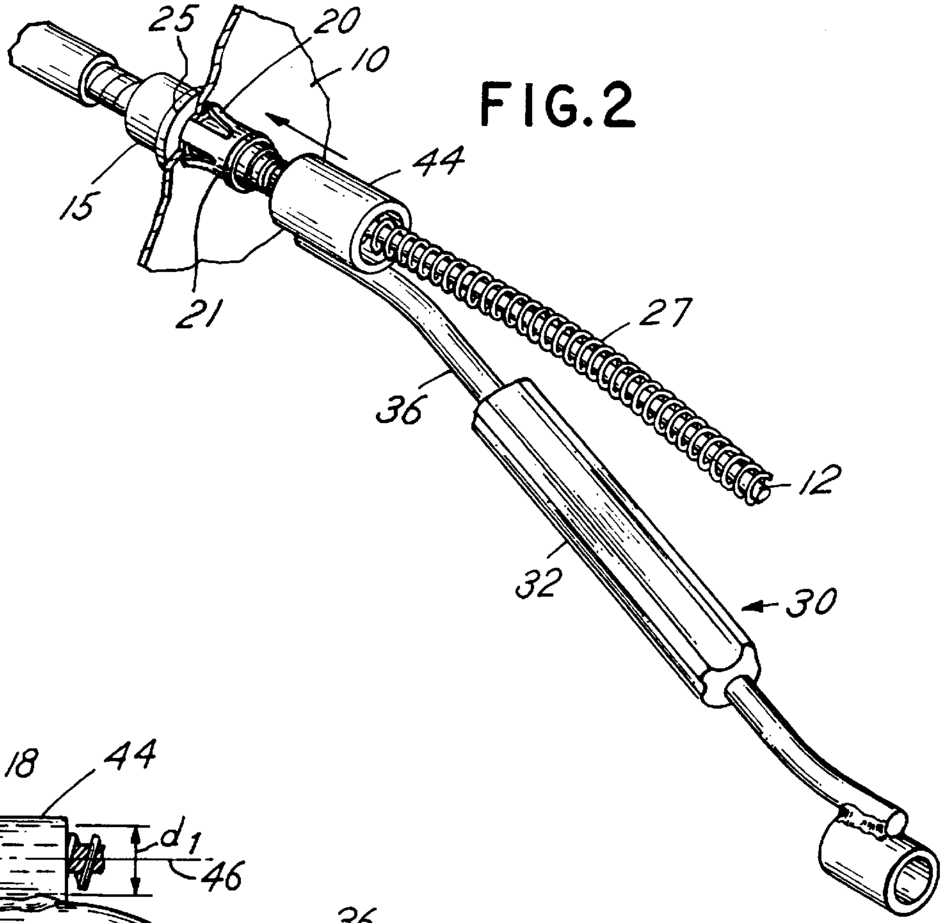
FIG. 2 is an isometric view of a typical parking brake cable and connection therefore and incorporating the tool of the invention to effect removal of the parking brake cable connection.
Figure 3:
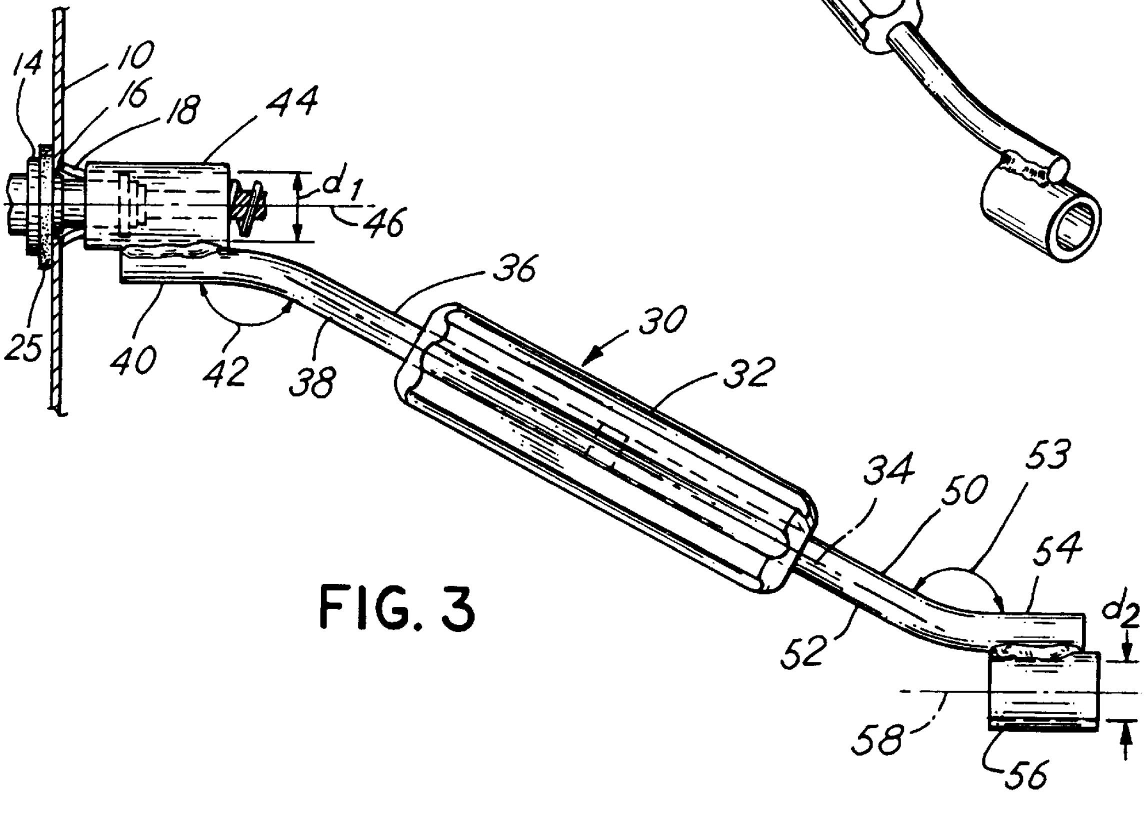
FIG. 3 is a side elevation of the tool of FIG. 1.

A first cylindrical tubular section or member 44 is attached to the outside of the extension 40. The tubular section 44 includes a center line axis 46 which intersects the center line axis 34 of the handle 32. Tubular member 44 has an internal diameter, $d_1$, which is approximately equal to the external diameter of the spring 18. Thus, when the tubular member 44 is placed over the spring 18 and section 19 and flexible fingers 20, the fingers 20 are compressed thereby enabling the cable 12 and the assembly associated with the backing plate 14 to be removed from the opening 16 in wall 10 in the direction indicated by the arrow in FIG. 2.

Extending from the opposite end of the handle 32 is a second shaft 50 which includes a first extension 52 and an end or second integral, connected extension 54. First and second extensions 52, 54 also form an included obtuse angle of 110° to about 170°. The members or sections 52 and 54 define an obtuse angle therebetween substantially equal to the obtuse angle 42. A second tubular member 56 is attached to the end extension 54. The tubular member 56 has a center line axis 58. The tubular section 56 is also hollow or has a throughbore adapted to fit over a series of flexible fingers associated with a cable retaining snap fastener. However, the diameter, $d_2$, of the tubular member 56 is distinct from that of the tubular member 44 to thereby accommodate different size snap fasteners of backing plate holders. The center line axes 46 and 58 are generally parallel to one another as are the end extensions 40 and 54. The axis 34 also intersects the axis 58 and the three axes 46, 34, 58 are all coplanar in the preferred embodiment.

FIG. 1 illustrates the manner by which the tubular member 44 may be fitted over cable 12 and spring 13, which surrounds the cable 12, so as to engage and flex the fingers

20. The described construction is especially useful in situations where parts are not easily accessible and facilitate appropriate alignment of the tool to permit easy access and utility with respect to brake cables regardless of the housing and backing plate construction that is used.

Various modifications may be made to the tool without departing from the spirit and scope of the invention. Thus, while there has been described a preferred embodiment of the invention, it is to be understood that the invention is limited only by the following claims and their equivalents.

What is claimed is:

1. A method for removal of a snap fastener from an opening in a wall, said fastener having an annular flange with a center opening, a tubular member co-extensive with the opening and extending from the flange and flexible arms with one end of each arm affixed to the outside of the tubular member, and the other end flared outwardly and extending toward the flange, each of said arms being elastic and extending toward the flange to retain the fastener in a wall opening by engagement of the flange against one side of the wall and the flared end of the flexible arms against the other side of the wall, the wall opening sized to receive the tubular member and flexible arms therethrough when the flexible arms are biased against the tubular member, said method comprising the steps of:

gripping a tool having a cylindrically shaped handle having a center line axis and first and second spaced transverse ends separated by an axial dimension;

a first shaft and a second shaft, said shafts extending axially in opposite directions from the first and second ends, said shafts being coaxial with the handle and each other, each shaft extending axially at least about one half the axial dimension of the handle, each shaft further including an end extension forming an obtuse angle with the connected axial shaft, said obtuse angle in the range of about 110° to 170°, each end extension having a linear extension about one quarter the axial dimension, said end extensions being parallel to each other;

a first cylindrical tube on one end extension with the axis of the first tube parallel to said one end extension, said first tube attached to the one end extension and having a tube center line axis, the tube center line axis intersecting the handle center line axis;

a second cylindrical tube on the other end extension, having a second tube center line axis, said center line axis of the second tube parallel to said other end extension and intersecting the handle center line axis, said second tube attached to the other end extension, said tubes having distinct internal diameters separately compatible with emergency brake release member retainer fasteners by the handle;

aligning one of said tubes over the flexible arms to bias the arms against the tubular member;

moving the biased arms and tubular member through the opening to release the fastener from the opening; and removing of the tube from the fastener to release the fasteners.

* * * * *